US011632163B1

(12) United States Patent
Chisu et al.

(10) Patent No.: US 11,632,163 B1
(45) Date of Patent: Apr. 18, 2023

(54) COMMUNICATION DEVICE WITH MILLIMETER WAVE MULTIPATH SELECTION AND AGGREGATION USING WEARABLE REFLECTIVE SURFACES

(71) Applicant: MOTOROLA MOBILITY LLC, Wilmington, DE (US)

(72) Inventors: Daniel C Chisu, Franklin Park, IL (US); Si Chen, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/553,281

(22) Filed: Dec. 16, 2021

(51) Int. Cl.
*H04B 7/08* (2006.01)
*H04W 72/044* (2023.01)
*H04W 72/542* (2023.01)

(52) U.S. Cl.
CPC ........... *H04B 7/082* (2013.01); *H04B 7/0897* (2013.01); *H04W 72/046* (2013.01); *H04W 72/542* (2023.01)

(58) Field of Classification Search
CPC ... H04B 7/082; H04B 7/0897; H04W 72/046; H04W 72/085
See application file for complete search history.

(56) References Cited

U.S. PATENT DOCUMENTS

| 6,356,238 B1 | 3/2002 | Gainor et al. |
| 7,030,819 B2 | 4/2006 | Horibe |
| 10,003,369 B2 | 6/2018 | Doi et al. |
| 10,727,600 B1 | 7/2020 | Saeidi et al. |
| 2022/0014935 A1* | 1/2022 | Haija .................. H04B 17/336 |

FOREIGN PATENT DOCUMENTS

| CN | 110266352 B | 5/2021 |
| WO | 2021109345 A1 | 6/2021 |

OTHER PUBLICATIONS

Wu, Qingqing et al., Towards Smart and Reconfigurable Environment: Intelligent Reflecting Surface Aided Wireless Network, arXiv:1905.00152v5 [cS.IT]. Aug. 30, 2019.

* cited by examiner

*Primary Examiner* — Rahel Guarino
(74) *Attorney, Agent, or Firm* — Isidore PLLC

(57) ABSTRACT

A communication device, computer program product, and method provide improved communication performance by a wearable communication device. The communication device receives multipaths of a millimeter wave (mmWave) signal created by a wearable radio frequency (RF) reflecting surface being worn by a person. Controller of the communication device identifies a first direction from which a direct path downlink signal is received and a second direction from which a corresponding a multipath downlink signal is received. The controller determines that the multipath downlink signal is being reflected from the wearable RF reflecting surface. In response to determining that the multipath downlink signal is being reflected from the wearable RF reflecting surface, the controller synchronizes and aggregates the direct path downlink signal and the multipath downlink signal to produce a processed downlink signal that is a better signal than the direct path downlink signal. The controller demodulates the processed downlink signal.

20 Claims, 6 Drawing Sheets

COMMUNICATION DEVICE WITH MILLIMETER WAVE MULTIPATH SELECTION AND AGGREGATION USING WEARABLE REFLECTIVE SURFACES

BACKGROUND

1. Technical Field

The present disclosure relates generally to communication devices, and more particularly to communication devices that directionally optimize radio frequency antenna steering.

2. Description of the Related Art

Mobile communication devices such as smartphones provide a large amount of functionality in a small form factor. The small size enables mobility but limits available space for antennas. To support increased data throughput for functions such as media streaming, mobile communication devices are incorporating millimeter wave (mmWave) communication subsystems to support upper bands allocated to fifth generation (5G) new radio (NR) technologies. The higher frequencies can inherently support greater data speeds. However, the mmWave signals are also inherently more directional as compared to lower radio frequency (RF) bandwidths used for fourth generation (4G) technologies such as the 3rd Generation Partnership Project (3GPP) long term evolution (LTE). Presenting antennas in all required directions is difficult within the form factor of small mobile communication devices that are hand carried or stowed in a pocket.

Augmented reality (AR) display devices, such as AR glasses or goggles, are being introduced in part to provide display options that are not constrained by the small form factor of a mobile communication device. Being able to combine real world imagery with AR imagery enables new "hands free" and "eyes on" uses. A person wearing the AR display device can perform functions such, as walking along an AR provided path and using his hands to interface with AR presented objects, assisted by the AR imagery. The AR imagery may include entertainment content, communication services, or user interface controls for other devices. Many of the AR functions rely on AR display device being able to communicate with a network node, such as a 5G NR base node using an integrated antenna system. As a worn device, AR display devices experience communication limitations. For example, AR glasses or googles have constrained areas available for presenting RF antennas to make a direct path communication channel with a nearby 5G NR base node.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
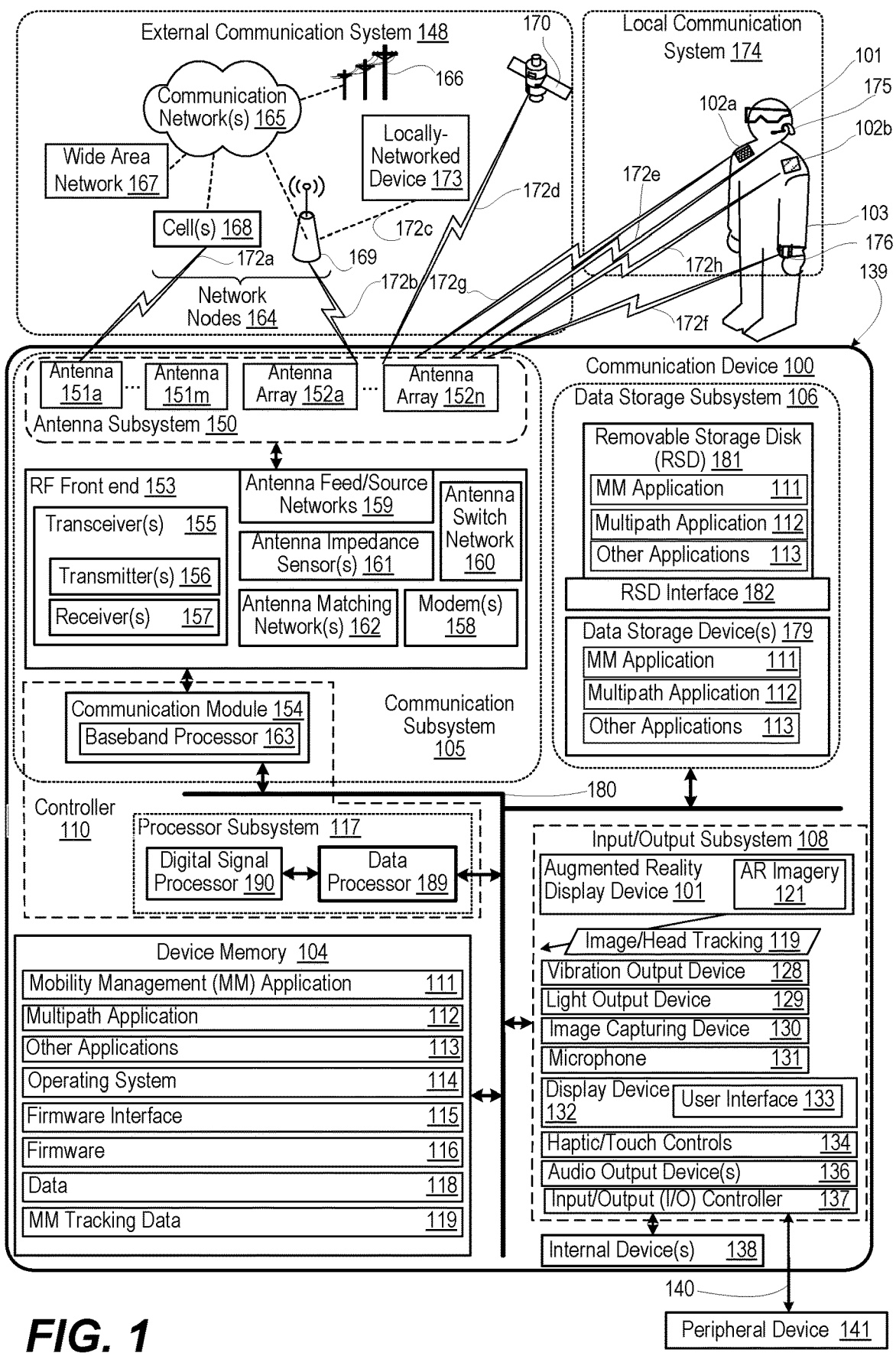
FIG. 1 depicts a functional block diagram of a communication environment including a communication device having an augmented reality (AR) display device, and within which the features of the present disclosure are advantageously implemented, according to one or more embodiments.

According to a first aspect of the present disclosure, a communication device, a computer program product, and a method provide improve communication performance for the communication device. The communication device includes a communication subsystem having an antenna subsystem and a radio frequency (RF) frontend configurable to communicate in a millimeter wave (mmWave) band. The antenna subsystem of the communication subsystem receives multipaths of an mmWave signal. The multipaths are created by at least one wearable RF reflecting surface being worn by a person or attached to a garment or accessory being worn by the person or attached to an object tethered to or otherwise in proximity to the person and which moves with the person (e.g., a guide animal for a seeing impaired person or a robot companion). As used herein, the word "person" applies to a human person, an animal person, or an artificial person, although the illustrative embodiments are primarily presented with a human person. A controller of the communication device is communicatively coupled to the communication subsystem. The controller configures the RF frontend to identify a first direction from which a direct path downlink signal is received and at least one second direction from which at least one corresponding multipath downlink signal is received. The controller determines that the at least one corresponding multipath downlink signal is being reflected from the at least one wearable RF reflecting surface. In response to determining that the at least one corresponding multipath downlink signal is being reflected from the at least one wearable RF reflecting surface, the controller synchronizes and aggregates the direct path downlink signal and each of the at least one corresponding multipath downlink signal to produce a processed downlink signal that is at least one of a better and a stronger signal than the direct path downlink signal. The controller demodulates the processed downlink signal.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 depicts a functional block diagram of an electronic device, specifically communication device 100, that provides improved communication reception and transmission in mmWave bands, within an operating environment that includes a person having a garment or accessory with at least one wearable RF reflecting surface. Several of the features of the present disclosure are advantageously implemented by/within communication device 100. In one or more embodiments, communication device 100 includes AR display device 101 or similar devices with limitations on antenna coverage for line of sight (LoS) signals such as in the millimeter wave (mmWave) frequencies. In one or more embodiments, one or more passive RF reflective surfaces 102a are worn by person 103 who also wears AR display device 101. In one or more embodiments, one or more intelligent RF reflective surfaces 102b are worn by person 103 who also wears AR display device 101.

Referring now to the specific component makeup and the associated functionality of communication device 100. In one or more embodiments, communication device 100 includes device memory 104, communication subsystem 105, data storage subsystem 106, and input/output (I/O) subsystem 108. Device memory 104 and each subsystem (105, 106, and 108) are managed by controller 110. Device memory 104 includes program code for applications, such as augmented reality (AR) application 111, multipath application 112, and other application(s) 113. Device memory 104 further includes operating system (OS) 114, firmware interface 115, such as basic input/output system (BIOS) or Uniform Extensible Firmware Interface (UEFI), and firmware 116.

In one or more embodiments, controller 110 includes processor subsystem 117, which executes program code to provide operating functionality of communication device 100. The software and/or firmware modules have varying functionality when their corresponding program code is executed by processor subsystem 117 or secondary processing devices within communication device 100. Processor subsystem 117 of controller 110 can execute program code of mobility management application 111, multipath application 112, and other application(s) 113 to configure communication device 100 to perform specific functions. Device memory 104 can include data 118 used by the applications. In one or more embodiments, device memory 104 includes RF reflective surface tracking data 119 that captures multipath capabilities of RF reflective surface(s) 102. In one or more embodiments, controller 110 executes mobility management (MM) application 111 to update MM tracking data 119. MM tracking data 119 includes tracking relative location to RF reflecting surfaces 102a-102b.

Antenna elements are operated as an array to achieve antenna steering in particular directions. Antenna steering enables selection of a particular antenna beam that provides the best communication quality. Mobility management dynamically switches to the best beam angle as the relative angle changes between the communication device and the base station. For example, fifth generation new radio (5G NR) mobility management is defined in the 3rd Generation Partnership Project (3GPP) standards Release 15-16, which includes procedures for mobility management. The communication device periodically performs transmit and receive beam sweeping to determine reference signal receive power measurements across up to 64 beams. For power and computational efficiency, communication device 100 selects an acquisition cone comprised of a subset of eight (8) beams of the 64 beams for mobility management. Certain power and computational efficiencies are realized by limited the beams used during a subsequent communication session. The acquisition cone is sufficient to maintain mobility management with typical movements of communication device 100. In an example, communication device 100 determines what beams correspond to a direct path or to a multipath in response to signal remaining strong for a period of time during a power measurement process. Communication device 100 distinguish a direct path versus a multipath by maintaining MM tracking data 119. In an example, communication device 100 may associate certain beams with a location of RF reflecting surface 102a 102b.

I/O subsystem 108 includes user interface components such as vibration output device 128, light output device 129, image capturing device(s) 130, microphone 131, display device 132 that presents user interface 133, touch/haptic controls 134, and audio output device(s) 136. I/O subsystem 108 also includes I/O controller 137. I/O controller 137 provides communication and power signals to functional components described herein as part of device memory 104, communication subsystem 105, data storage subsystem 106, or I/O subsystem 108. I/O controller 137 connects to internal devices 138, which are internal to housing 139, and via electrical cable 140 to tethered peripheral devices 141, which are external to housing 139 of communication device 100. Internal devices 138 include computing, storage, communication, or sensing components depicted within housing 139. I/O controller 137 supports the necessary configuration of connectors, electrical power, communication protocols, and data buffering to act as an interface between internal devices 138 and peripheral devices 141.

Communication device 100 may be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless and/or wired communication functionality. As an electronic device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the communication components and features of communication device 100. Communication subsystem 105 of communication device 100 enables wireless communication with external communication system 148. Communication subsystem 105 includes antenna subsystem 150 having lower band antennas 151a-151m and higher band antenna arrays 152a-152n that can be attached in/at different portions of housing 139. Communication subsystem 105 includes radio frequency (RF) front end 153 and communication module 154. RF front end 153 includes transceiver(s) 155, which includes transmitter(s) 156 and receiver(s) 157. RF front end 153 further includes modem(s) 158. RF front end 153 includes antenna feed/source networks 159, antenna switch network 160, antenna impedance sensor(s) 161, and antenna matching network(s) 162. Communication module 154 of communication subsystem 105 includes baseband processor 163 that communicates with processor subsystem 117 and RF front end 153. In one or more embodiments, controller 110 includes baseband processor 163. In one or more embodiments, controller 110 includes both processor subsystem 117 and baseband processor 163. Baseband processor 163 operates in a baseband frequency range to encode data for transmission and decode received data, according to a communication protocol. Modem(s) 158 modulate baseband encoded data from communication module 154 onto a carrier signal to provide a transmit signal that is amplified by transmitter(s) 156. Modem(s) 158 demodulates each signal received from external communication system 148 using by antenna subsystem 150. The received signal is amplified and filtered by receiver(s) 157, which demodulate received encoded data from a received carrier signal. Antenna feed/source networks 159 transmits or receives from particular portions of antenna subsystem 150 and can adjust a phase between particular portions of antenna subsystem 150. Antenna switch network 160 can connect particular combinations of antennas (151a-151m, 152a-152n) to transceiver(s) 155. Controller 110 can monitor changes in antenna impedance detected by antenna impedance sensor(s) 161 for determining portions of antenna subsystem 150 that are blocked. Antenna matching network(s) 162 are connected to particular lower band antennas 151a-151m to tune impedance respectively of lower band antennas 151a-151m to match impedance of transceiver(s) 155. Antenna matching network(s) 162 can also be used to detune the impedance of lower band antennas 151a-151m to not match the impedance of transceiver(s) 155 to electromagnetically isolate a particular antenna.

In one or more embodiments, controller 110, via communication subsystem 105, performs multiple types of over-the-air (OTA) communication with network nodes 164 of external communication system 148. Particular network nodes 164 can be part of communication network infrastructure 165 of public land mobile networks (PLMNs) that provide connections to plain old telephone systems (POTS) 166 for voice calls and wide area networks (WANs) 167 for data sessions. WANs 167 can include Internet and other data networks. The particular network nodes 164 can be cellular "cells", base nodes, or base stations 168 that support cellular OTA communication using RAT as part of a radio access network (RAN). Unlike earlier generations of cellular services, where voice and data were handled using different RATs, both are now integrated with voice being considered one kind of data communication. Conventionally, broadband, packet-based transmission of text, digitized voice, video, and multimedia communication are provided using Fourth generation (4G) RAT of evolved UTMS radio access (E-UTRA), referred to a Long Term Evolved (LTE), although some cellular data service is still being provided by third generation (3G) Universal Mobile Telecommunications Service (UMTS). A fifth generation (5G) RAT, referred to as fifth generation new radio (5G NR), is being deployed to at least augment capabilities of 4G LTE with a yet higher capability of data transfer. Development continues for what will be sixth generation (6G) RATs and more advanced RATs. With wireless frequency spectrum seemingly ever expanding, additional antennas (151a-151m, 152a-152n) are incorporated to support newer radio access technologies (RATs) and multi band operation. Dual low band (2L) or quad low band (4L) multiple input multiple output (MIMO) operation dictates multiple antennas communicate on multiple bands simultaneously.

In one or more embodiments, network nodes 164 can be access node(s) 169 that support wireless OTA communication. Communication subsystem 105 can receive OTA communication from location services such as provided by global positioning system (GPS) satellites 170. Communication subsystem 105 communicates via OTA communication channel(s) 172a with base stations 168. Communication subsystem 105 communicates via wireless communication channel(s) 172b with access node(s) 169. In one or more particular embodiments, access node(s) 169 supports communication using one or more IEEE 802.11 wireless local area network (WLAN) protocols. Wi-Fi™ is a family of wireless network protocols, based on the IEEE 802.11 family of standards, which are commonly used between user devices and network devices that provide Internet access. In one or more particular embodiments, communication subsystem 105 communicates with one or more locally networked devices 173 via wired or wireless link 172c provided by access node(s) 169. Communication subsystem 105 receives GPS signal(s) 172d broadcast by GPS satellites 170 to obtain geospatial location information.

Baseband processor 163 configures antenna feed/source network 159 to select particular elements of antenna arrays 152a-152n with particular phase delays to steer antenna gain in a particular direction. Received signals are measured by receivers 157 during periodic scanning modes to identify a direct or multipath direction to particular cells or base stations 168. During a communication session, baseband processor 163 uses the antenna beam directions with the best communication reception to receive and to transmit with an associated one of cell(s) or base stations 168.

In one or more embodiments, controller 110, via communication subsystem 105, performs multiple types of OTA communication with local communication system 174. In one or more embodiments, local communication system 174 includes wireless headset 175 and smart watch 176 that are coupled to communication device 100 to form a personal access network (PAN). Communication subsystem 105 communicates via low power wireless communication channel(s) 172e with wireless headset 175. Communication subsystem 105 communicates via second low power wireless communication channel(s) 172f, such as Bluetooth, with smart watch 176 used by person 103. Multipath communication channel 172g between Communication subsystem 105 and cell or base station 168 includes a reflection off of passive RF reflective surface 102a. Multipath communication channel 172g includes one or more of an uplink signal and a downlink signal using mmWave 5G NR radio access technology (RAT). Multipath communication channel 172h between communication subsystem 105 and cell or base station 168 includes redirection at intelligent RF reflective surface 102b. Multipath communication channel 172h includes one or more of an uplink signal and a downlink signal using mmWave 5G NR RAT.

Data storage subsystem 106 of communication device 100 includes data storage device(s) 179. Controller 110 is communicatively connected, via system interlink 180, to data storage device(s) 179. Data storage subsystem 106 provides applications, program code, and stored data on nonvolatile storage that is accessible by controller 110. For example, data storage subsystem 106 can provide a selection of applications and computer data such as MM application 111, multipath application 112, and other application(s) 113. These applications can be loaded into device memory 104 for execution by controller 110. In one or more embodiments, data storage device(s) 179 can include hard disk drives (HDDs), optical disk drives, and/or solid-state drives (SSDs), etc. Data storage subsystem 106 of communication device 100 can include removable storage device(s) (RSD(s)) 181, which is received in RSD interface 182. Controller 110 is communicatively connected to RSD 181, via system interlink 180 and RSD interface 182. In one or more embodiments, RSD 181 is a non-transitory computer program product or computer readable storage device. Controller 110 can access RSD 181 or data storage device(s) 179 to provision communication device 100 with program code, such as code for MM application 111, multipath application 112, and other application(s) 113.

Controller 110 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 110 includes processor subsystem 117, which includes one or more central processing units (CPUs), depicted as data processor 189. Processor subsystem 117 can include one or more digital signal processors 190 that are integrated with data processor 189. Processor subsystem 117 can include other processors that are communicatively coupled to data processor 189, such as baseband processor 163 of communication module 154. In one or embodiments that are not depicted, controller 110 can further include distributed processing and control components that are external to housing 139 or grouped with other components, such as I/O subsystem 108. Data processor 189 is communicatively coupled, via system interlink 180, to device memory 104. In one or more embodiments, controller 110 of communication device 100 is communicatively coupled via system interlink 180 to communication subsystem 105, data storage subsystem 106, and I/O subsystem 108.

System interlink 180 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 180) are illustrated in FIG. 1, it is to be understood that more, fewer, or different interconnections may be present in other embodiments.

Within the description of the remaining figures, references to similar components presented in a previous figure are provided the same reference numbers across the different figures. Where the named component is presented with different features or functionality, a different reference numeral or a subscripted reference numeral is provided (e.g., 100a in place of 100).

Figure 2:
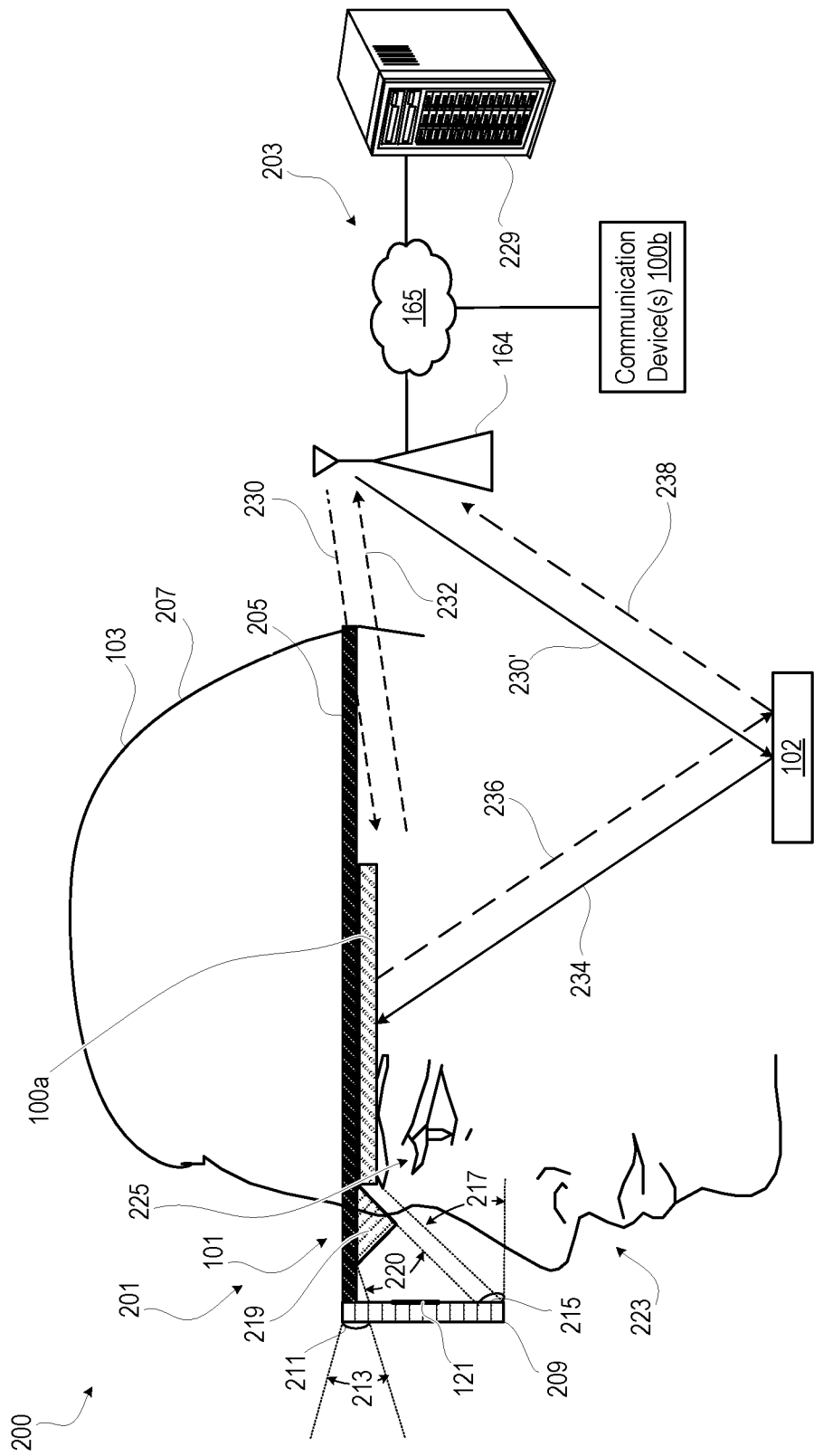
FIG. 2 depicts a communication environment with AR display device assembly in communication with a communication network enabled by multipath reflection from a radio frequency (RF) reflecting surface attached to a garment worn by the person wearing the AR display device assembly, according to one or more embodiments.

FIG. 2 depicts first communication environment 200 with communication device 100a in communication with communication network 203 to support AR display device 101a. Communication device 100a is an implementation of communication device 100 of FIG. 1 and may have similar or identical components in a smaller form factor than the mobile phone of FIG. 1. Communication device 100a includes components that are compatible with a form factor for an article that is to be worn, carried, or stowed in a pocket by person 103. In an example, communication device 100a includes visor, goggle, or eyeglasses frame 205 that is received or placed on head 207 of person 103 and supports communication device 100a including optical components of AR display device 101a. These optical components include: (i) lenses 209; (ii) first camera 211 that is forward oriented with a first FOV 213; (iii) second camera 215 that is aft oriented with a second FOV 217; and (iv) AR projector 219 having a field of focus 220 to project AR imagery 121 on lenses 209. In one or more embodiments, lenses 209 include an electrochromatic material that darkens in response to a control signal. Communication device 100a may monitor an image stream from first camera 211 for an ambient light measurement. Communication device 100a may monitor an image stream from second camera 215 directed at a portion of face 223 of person 103, such as for facial recognition or for detecting eye glance direction and eyelid position of eyes 225.

Communication network 203 includes network server(s) 229 communicatively connected to communication network(s) infrastructure 165, which has at least one network node 164. Communication device 100a supports one or more over-the-air (OTA) communication protocols that include mmWave frequencies to receive content originating from network server(s) 229 or other communication device(s) 100b that are connected to communication network infrastructure 165. Communication device 100a supports one or more OTA communication protocols, including mmWave frequencies, to transmit content that terminates at network server(s) 229 or other communication devices 100b. In certain locations and with certain orientations of head 207, communication device 100 does not receive direct path downlink signal 230 with sufficient received strength from network node 164 to accomplish downlink communication at a required data rate or quality of service (QoS). Similarly, in certain locations and with certain orientations of head 207, communication device 100 does not transmit direct path uplink signal 232 with sufficient received strength at network node 164 to accomplish uplink communication at a required data rate or QoS. Network node 164 is relatively distant from communication device 100a as compared to spacing of RF reflecting surface 102 and communication device 100a. Thus, RF reflecting surface 102 may be oriented to receive a portion of direct path downlink signal 230' and reflect multipath downlink signal 234 toward communication device 100. Similarly, communication device 100 steers multipath uplink signal 236 to reflect off of RF reflecting surface 102 as reflected multipath uplink signal 238 toward network node 164.

Figure 3:
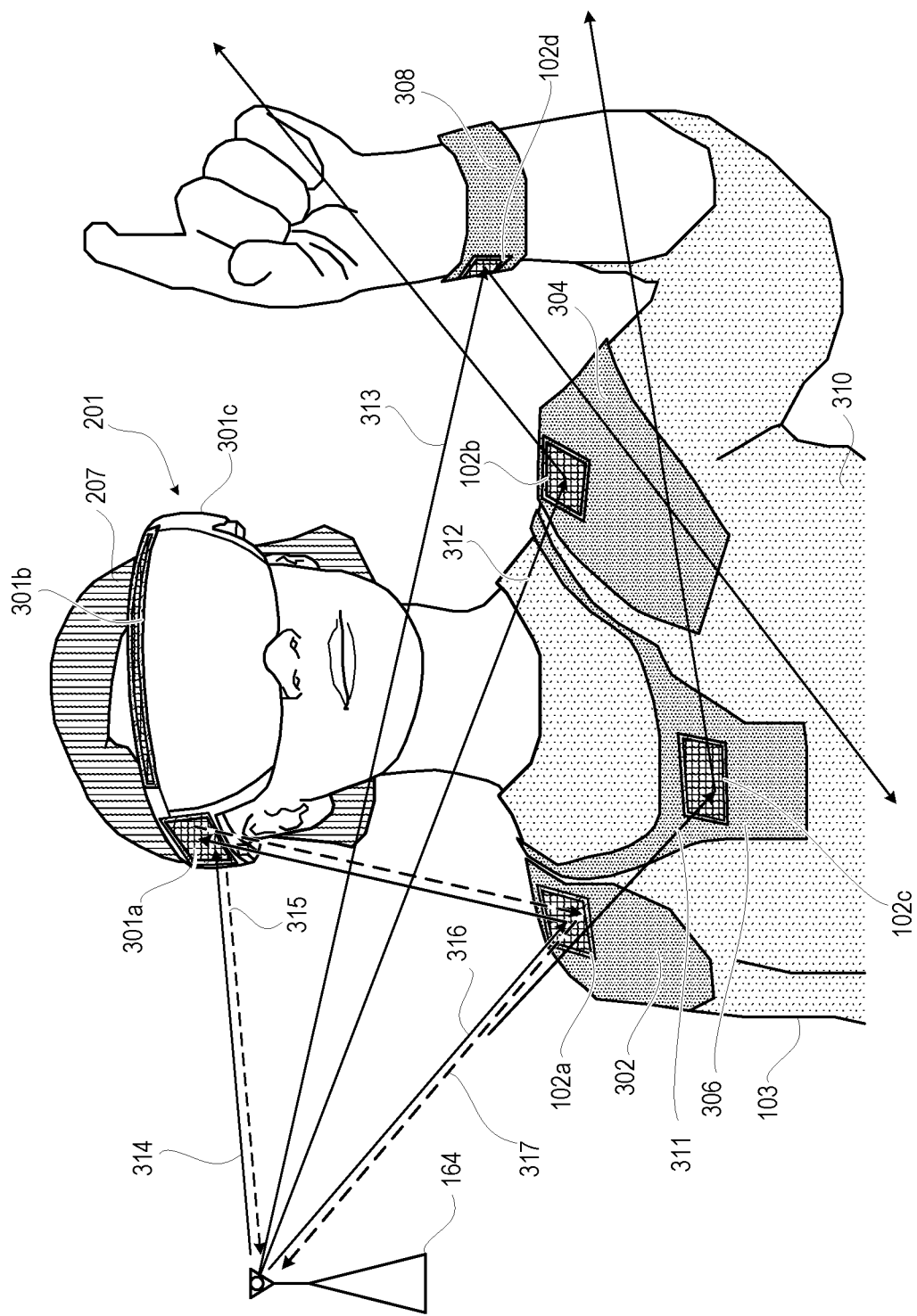
FIG. 3 depicts an AR display device assembly being worn by a person who is also wearing a garment with more than one RF reflecting surface, providing more opportunities for successful multipath reflections from or toward a cell, according to one or more embodiments.

FIG. 3 depicts AR display device assembly 201 being worn by person 103 who is also wearing more than one RF reflecting surface 102a-102d, providing more opportunities for successful multipath reflections from or toward network node 164. AR display device assembly 201 has limited surface areas 301a, 301b, and 301c to integrate mmWave antennas. In an example, first RF reflecting surface 102a is attached to right shoulder article 302. Second RF reflecting surface 102b is attached to left shoulder article 304. Third RF reflecting surface 102c is attached to chest article 306. Fourth RF reflecting surface 102d is attached to left wrist article 308. Each article 302, 304, 306, 308 may be a portion of a garment or may be a dedicated structure to support the respective RF reflecting surface 102a-102d. In an example, shoulder articles 302 and 306 may be pinned to an underlying garment. Chest article 304 may be worn on a lanyard and not attached to an underlying garment. In one or more embodiments, articles 302, 304 and 306 are wireless-capable communication devices that may or may not be equipped with a baseband processor (BP) modem for cellular service. Articles 302, 304 and 306 assist AR display device assembly 201 with RF reflecting surfaces 102a-102c for cellular communication. Left wrist article 308 may be a wireless-enabled smartwatch with an RF reflective band. Without RF reflecting surfaces 102a-102d, degraded reception and/or transmission may occur in a particular direction. Having multiple RF reflecting surfaces 102a-102d enables successful communication with side-to-side turning movement of head 207. RF reflecting surfaces 102a-102d are positioned to reflect toward head 207 incoming/received signals from network node 164. In an example, the orientation of head 207 and torso 310 of person 103 away network node 164 precludes a direct path. Multipaths 311, 312, and 313 respectively off of RF reflecting surfaces 102b-102d are not directed toward limited surface areas 301a-301c. Limited surface area 301a is at an obtuse angle with direct downlink 314 and direct uplink 315, which may provide inadequate communication performance alone for a required data rate or QoS. RF reflective surface 102a is aligned to reflect or redirect multipath downlink 316 and multipath uplink 317 to limited surface area 301a.

In one or more embodiments, RF reflecting surfaces 102a-102d are inexpensive layers of RF reflective material such a metal sputtered on a substrate. In one or more embodiments, RF reflecting surfaces 102a-102d are each an intelligent reflecting surface (IRS). IRS is able to significantly improve the performance of wireless communication networks by smartly reconfiguring the wireless propagation environment with the use of massive low-cost passive reflecting elements integrated on a planar surface. The hardware implementation of IRS is based on the concept of "metasurface", which is made of two-dimensional (2D) metamaterial that is digitally controllable. Specifically, the metasurface is a planar array consisting of a large number of elements or so-called meta-atoms with electrical thickness in the order of the subwavelength of the operating frequency of interest. In an example, 5G wireless technology utilizes a variety of frequency bands within ranges known as FR1 below 7.125 GHz and FR2 above 24.250 GHz for the 5G New Radio, 5G NR. FR2 wavelength is around 10 mm. IRS may be configured to reflect this wavelength. In wireless communication applications, the reflection coefficient of each element should be tunable to cater for dynamic wireless channels arising from the user mobility, thus requiring reconfigurability in real time. This can be achieved fabricating an array of electronic devices such as positive-intrinsic negative (PIN) diodes, field-effect transistors (FETs), or microelectromechanical system (MEMS) switches.

Figure 4:
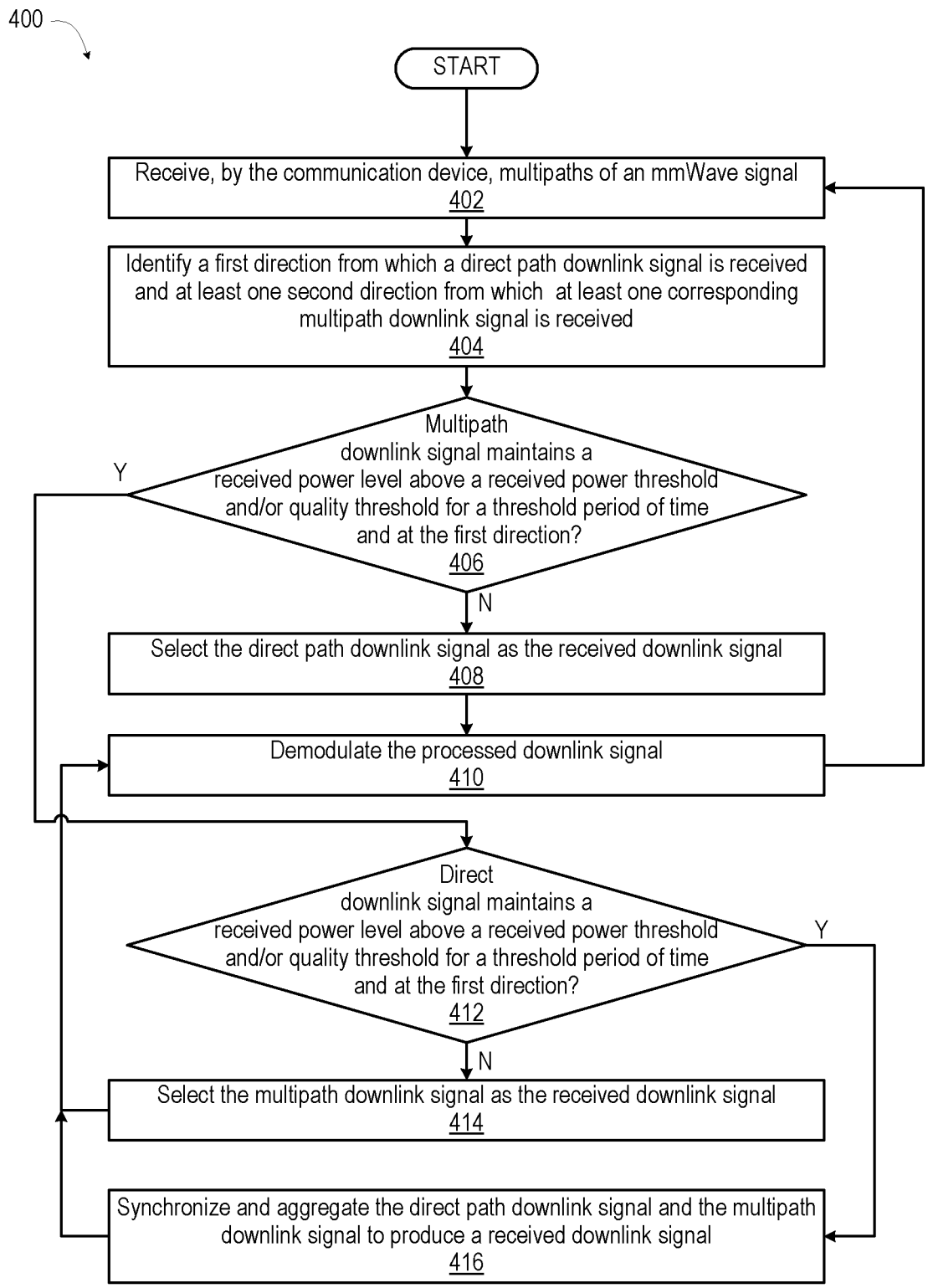
FIG. 4 depicts a flow diagram of a method performed by a communication device for receiving multipaths of a millimeter wave (mmWave) signal created by a wearable RF reflecting surface being worn by a person, according to one or more embodiments.
Figure 5A:
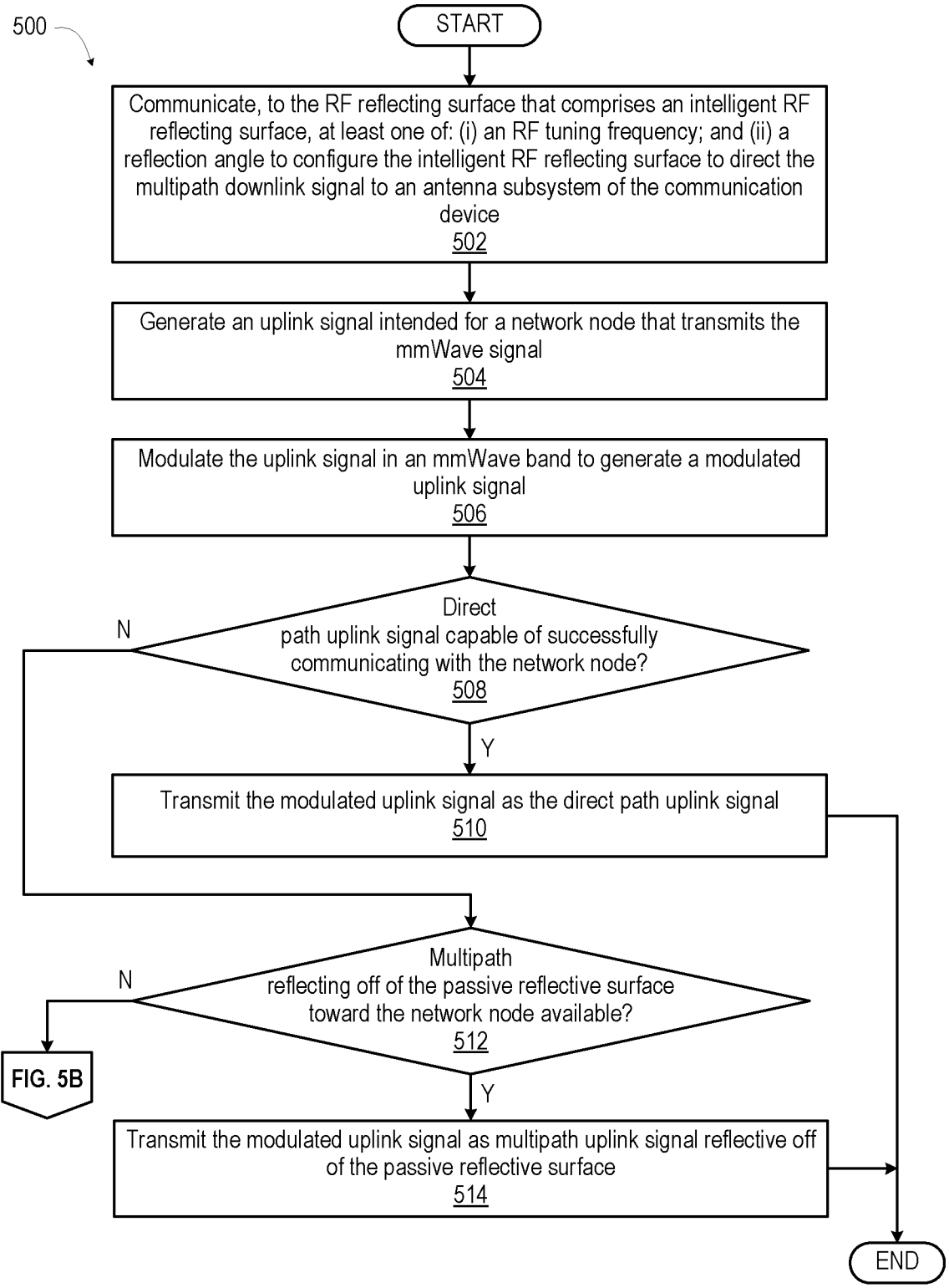
FIGS. 5A-5B (collectively FIG. 5) depict a flow diagram of a method performed by a communication device for transmitting a multipath of an mmWave signal created by the wearable RF reflecting surface being worn by a person, according to one or more embodiments.
Figure 5B:
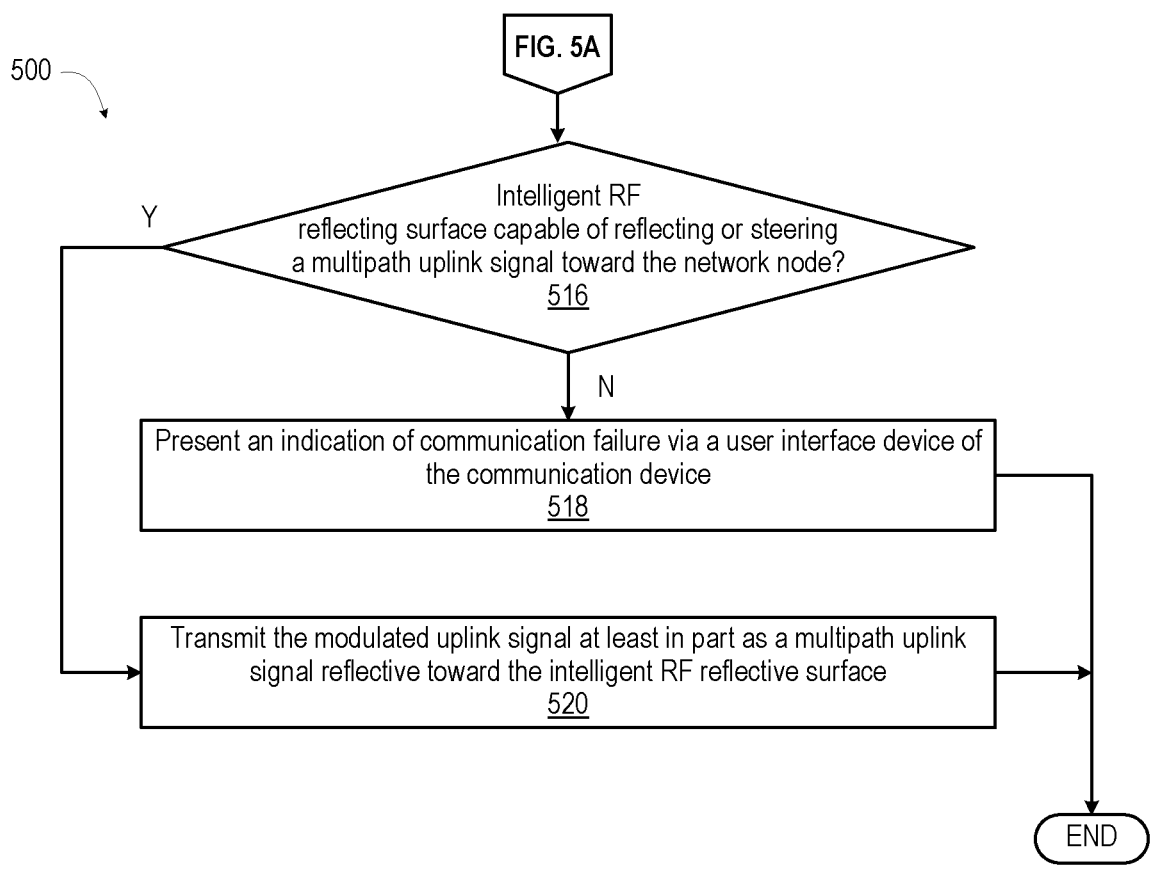

With reference now to the flow charts, there are presented method 400 (FIG. 4) and method 500 (FIGS. 5A-5B). FIG. 4 presents a flow diagram of method 400 performed by the communication device for receiving multipaths of an mmWave signal created by a wearable RF reflecting surface being worn by a person. FIGS. 5A-5B (collectively FIG. 5) present a flow diagram of method 500 performed by a communication device for transmitting a multipath of an mmWave signal created by the wearable RF reflecting surface being worn by a person. The descriptions of methods 400 and 500 are provided with general reference to the specific components illustrated within the preceding FIGS. 1-3, and specific components referenced in methods 400 and 500 may be identical or similar to components of the same name used in describing preceding FIGS. 1-3. In one or more embodiments, controller 110 configures communication device 100 to provide functionality of methods 400 and 500.

With reference to FIG. 4, method 400 includes receiving, by the communication device, multipaths of an mmWave signal (block 402). The multipaths are created by at least one wearable radio frequency (RF) reflecting surface being worn by a person. Method 400 includes identifying a first direction from which a direct path downlink signal is received and at least one second direction from which at least one corresponding multipath downlink signal is received (block 404). Method 400 includes determining whether the multipath downlink signal maintains a received power level above a received power threshold and/or quality threshold for a threshold period of time and at the first direction associated with the at the at least one wearable RF reflecting surface (decision block 406). In one or more embodiments, the received power threshold and/or quality threshold is established to be adequate or usable by the RF frontend of the communication device to demodulate a baseband signal that is carried by the downlink signal. A received downlink signal with less than the received power threshold and/or quality threshold is not usable for an application to receive the baseband signal with an acceptable level of errors in the baseband signal. The acceptable level of errors may be determined by the capability of included error encoding to correct up to particular error rate. The acceptable level of errors may be determined by what would be evident to a user of the communication device. The acceptable level of errors may be determined by a communication application executed by the communication device that consumes the baseband signal. For a mobile communication device that is worn, such as AR display devices, maintaining a multipath signal at a particular direction may indicate a passive reflective surface that is moving with the mobile communication device (i.e., being worn by the same person). In one or more embodiments, method 400 includes looking for multipath signals off of stationary objects when the mobile communication device is stationary or moving slowly relative to the distance to a reflecting surface. In response determining that the multipath downlink signal does not maintain the received power level above the received power threshold and/or quality threshold for the threshold period of time and at the second direction for mobility management, method 400 includes selecting the direct path downlink signal as the processed downlink signal (block 408).

Method 400 includes demodulating the processed downlink signal (block 410). Then method 400 returns to block 402. In response to determining that the multipath downlink signal maintains the received power level above the received power threshold and/or quality threshold for the threshold period of time and at the second direction, method 400 includes determining whether the direct path downlink signal maintains a received power level above the received power and/or quality threshold for the threshold period of time and at the first direction (decision block 412). In response determining that the direct downlink signal does not maintain a received power level above the received power threshold and/or quality threshold for the threshold period of time and at the first direction, method 400 includes selecting the multipath path downlink signal as the processed downlink signal (block 414). Then method returns to block 410. In response determining that the direct downlink signal maintains the received power level above the received power threshold and/or quality threshold for the threshold period of time and at the first direction, method 400 includes synchronizing and aggregating the direct path downlink signal and the multipath downlink signal to produce a processed downlink signal (block 416). Then method returns to block 410.

With reference to FIG. 5A, in one or more embodiments, method 500 includes transmitting, to the RF reflecting surface that comprises an intelligent RF reflecting surface, at least one of: (i) an RF tuning frequency; and (ii) a reflection angle to configure the intelligent RF reflecting surface to direct the multipath downlink signal in a direction toward an antenna subsystem of the communication device (block 502). Method 500 includes generating an uplink signal intended for a network node that transmits the mmWave signal (block 504). Method 500 includes modulating the uplink signal in an mmWave band to generate a modulated uplink signal (block 506). Method includes determining whether a direct path uplink signal is capable of successfully communicating with the network node (decision block 508). In response to determining that the direct path uplink signal is capable of successfully communicating with the network node, method 500 includes transmitting the modulated uplink signal as the direct path uplink signal (block 510). Then method 500 ends. In response to determining that the direct path uplink signal is not capable of successfully communicating with the network node at a required data rate or QoS, method 500 includes determining whether a multipath signal reflecting off of the passive reflective surface toward the network node is available (decision block 512). In an example, the controller of the communication device associates the first direction of the downlink signal with the network node as being available for the uplink signal. In response to determining that the multipath signal is available off of the passive reflective surface, method 500 includes transmitting the modulated uplink signal at least in part as a multipath uplink signal reflective off of the passive reflective surface (block 514). In one or more embodiments, method 500 may include transmitting the modulated uplink signal at least in part as a direct uplink signal. Then method 500 ends. In response to determining that the multipath is not available off of the passive reflective surface in decision block 512, method 500 proceeds to block 516 (FIG. 5B).

With reference to FIG. 5B, method 500 includes determining whether the intelligent RF reflecting surface is capable of reflecting or steering a communication transmission of a multipath uplink signal toward the network node (decision block 516). In response to determining that the intelligent RF reflecting surface is not capable of reflecting or steering a multipath uplink signal toward the network node, method 500 includes presenting an indication of communication failure via a user interface device of the communication device (block 518). Then, method 500 ends. In response to determining that the intelligent RF reflecting surface is capable of reflecting or steering a multipath uplink signal toward the network node, method including transmitting the modulated uplink signal at least in part as a multipath uplink signal toward the intelligent RF reflective surface (block 520). Then method 500 ends.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A communication device comprising:
    a communication subsystem having an antenna subsystem and a radio frequency (RF) frontend configurable to communicate in a millimeter wave (mmWave) band and which receives multipaths of an mmWave signal, the multipaths created by at least one wearable RF reflecting surface being worn by a person; and
    a controller that is communicatively coupled to the communication subsystem, and which:
        configures the RF frontend to identify a first direction from which a direct path downlink signal is received and at least one second direction from which at least one corresponding multipath downlink signal is received;
        determines that one of the at least one multipath downlink signal is being reflected from the at least one wearable RF reflecting surface; and
        in response to determining that one of the at least one multipath downlink signal is being reflected from the at least one wearable RF reflecting surface:
            synchronizes and aggregates the direct path downlink signal and the one of the at least one multipath downlink signal to produce a processed downlink signal; and
            demodulates the processed downlink signal.

2. The communication device of claim 1, wherein the controller determines that one of the at least one multipath downlink signal is being reflected from the at least one wearable RF reflecting surface by monitoring a received power level of the one of the at least one multipath downlink signal and determining that the one of the at least one multipath downlink signal maintains the received power level above a received power threshold and/or quality threshold for a threshold period of time and at the first direction associated with the at least one wearable RF reflecting surface.

3. The communication device of claim 2, wherein the controller demodulates the direct path downlink signal in response to determining that the one of the at least one multipath downlink signal does not maintain the received power level that is above the received power threshold and/or quality threshold for the threshold period of time at the first direction.

4. The communication device of claim 2, wherein the controller demodulates one of the at least one multipath downlink signal in response to determining that the direct path downlink signal is below a usable received power threshold and/or quality threshold.

5. The communication device of claim 1, wherein the controller:
    generates an uplink signal;
    modulates the uplink signal in an mmWave band to generate a modulated uplink signal; and
    transmits at least a part of the modulated uplink signal in the first direction.

6. The communication device of claim 1, further comprising the at least one RF reflecting surface configured to reflect the mmWave signal and to be worn by the same person wearing the communication device, the at least one wearable RF reflecting surface reflecting the one of the at least one multipath downlink signal in first direction to the communication device, wherein the at least one wearable RF reflecting surface comprises an RF reflecting surface that is passive.

7. The communication device of claim 1, further comprising the at least one wearable RF reflecting surface configured to direct the mmWave signal and to be worn by the same person wearing the communication device, wherein:
    the at least one wearable RF reflecting surface comprises an intelligent RF reflecting surface that is communicatively connected to the controller, and the controller communicates at least one of: (i) an RF tuning frequency; and (ii) a reflection angle to the intelligent RF reflecting surface to configure the intelligent RF reflecting surface to direct the one of the at least one multipath downlink signal to the antenna subsystem of the communication device.

8. The communication device of claim 7, wherein the controller determines whether the one of the at least one multipath downlink signal is being reflected from the at least one wearable RF reflecting surface at least in part by detecting a direction of communication transmissions from the intelligent RF reflecting surface.

9. A method comprising:
    receiving, by a communication device, multipaths of a millimeter wave (mmWave) signal, the multipaths created by at least one wearable radio frequency (RF) reflecting surface being worn by a person;

identifying a first direction from which a direct path downlink signal is received and at least one second direction from which at least one corresponding multipath downlink signal is received;

determining that one of the at least one multipath downlink signal is being reflected from the at least one wearable RF reflecting surface; and in response to determining that one of the at least one multipath downlink signal is being reflected from the at least one wearable RF reflecting surface:

synchronizing and aggregating the direct path downlink signal and the one of the at least one multipath downlink signal to produce a processed downlink signal; and demodulating the processed downlink signal.

10. The method of claim 9, wherein determining that one of the at least one multipath downlink signal is being reflected from the at least one wearable RF reflecting surface comprises monitoring a received power level of the one of the at least one multipath downlink signal and determining that the one of the at least one multipath downlink signal maintains the received power level above a received power threshold and/or quality threshold for a threshold period of time and at the first direction associated with the at least one wearable RF reflecting surface.

11. The method of claim 10, further comprising demodulating the direct path downlink signal in response to determining that the one of the at least one multipath downlink signal does not maintain the received power level that is above the received power threshold and/or quality threshold for the threshold period of time at the first direction.

12. The method of claim 10, further comprising demodulating one of the at least one multipath downlink signal in response to determining that the direct path downlink signal is below a usable received power threshold and/or quality threshold.

13. The method of claim 9, further comprising:
generating an uplink signal;
modulating the uplink signal in an mmWave band to generate a modulated uplink signal; and
transmitting at least a part of the modulated uplink signal in the first direction.

14. The method of claim 9, wherein the at least one wearable RF reflecting surface comprises an RF reflecting surface configured to passively reflect in an mmWave signal and to be worn by the same person wearing the communication device, the at least one wearable RF reflecting surface reflecting the one of the at least one multipath downlink signal in first direction to the communication device.

15. The method of claim 9, further comprising communicating, to the at least one wearable RF reflecting surface that comprises an intelligent RF reflecting surface, at least one of: (i) an RF tuning frequency; and (ii) a reflection angle to configure the intelligent RF reflecting surface to direct the one of the at least one multipath downlink signal to the antenna subsystem of the communication device.

16. The method of claim 15, further comprising determining whether the one of the at least one multipath downlink signal is being reflected from the at least one wearable RF reflecting surface at least in part by detecting a direction of communication transmissions from the intelligent RF reflecting surface.

17. A computer program product comprising:
A non-transitory computer readable storage device; and
program code on the non-transitory computer readable storage device that when executed by a processor associated with a communication device, the program code enables the communication device to provide functionality of:
receiving, by the communication device, multipaths of a millimeter wave (mmWave) signal, the multipaths created by at least one wearable radio frequency (RF) reflecting surface being worn by a person;
identifying a first direction from which a direct path downlink signal is received and at least one second direction from which at least one corresponding multipath downlink signal is received;
determining that one of the at least one multipath downlink signal is being reflected from the at least one wearable RF reflecting surface; and
in response to determining that one of the at least one multipath downlink signal is being reflected from the at least one wearable RF reflecting surface:
synchronizing and aggregating the direct path downlink signal and the one of the at least one multipath downlink signal to produce a processed downlink signal; and
demodulating the processed downlink signal.

18. The computer program product of claim 17, wherein the program code enables the communication device to provide the functionality of determining that one of the at least one multipath downlink signal is being reflected from the at least one wearable RF reflecting surface comprises monitoring a received power level of the one of the at least one multipath downlink signal and determining that the one of the at least one multipath downlink signal maintains the received power level above a received power threshold and/or quality threshold for a threshold period of time and at the first direction associated with the at least one wearable RF reflecting surface.

19. The computer program product of claim 18, wherein the program code enables the communication device to provide the functionality of demodulating the direct path downlink signal in response to determining that the one of the at least one multipath downlink signal does not maintain the received power level that is above the received power threshold and/or quality threshold for the threshold period of time at the first direction.

20. The computer program product of claim 17, wherein the program code enables the communication device to provide the functionality of demodulating one of the at least one multipath downlink signal in response to determining that the direct path downlink signal is below a usable received power threshold and/or quality threshold.

* * * * *